United States Patent

[11] 3,586,045

[72] Inventor Ray R. Zimmer
 Lewisville, Tex.
[21] Appl. No. 864,472
[22] Filed Oct. 7, 1969
[45] Patented June 22, 1971
[73] Assignee Victor Equipment Company
 Denton, Tex.

[54] FLOW MEASURING DEVICE CONTROLLING BOTH PRESSURE AND FLOW RATE
6 Claims, 3 Drawing Figs.

[52] U.S. Cl. .................................................... 137/551,
 137/505.18
[51] Int. Cl. ........................................................ F16k 37/00;
 F16k 31/12
[50] Field of Search ............................................. 137/116.3,
 116.5, 505.18, 551, 557, 559; 73/209

[56] References Cited
UNITED STATES PATENTS

| | | | |
|---|---|---|---|
| 2,707,966 | 5/1955 | Taplin ............................ | 137/505.18 X |
| 3,287,970 | 11/1966 | Harris ............................ | 73/209 |
| 3,367,351 | 2/1968 | Smyers .......................... | 137/557 X |
| 3,495,607 | 2/1970 | Shugarman ................... | 137/557 X |

*Primary Examiner*—Henry T. Klinksiek
*Attorney*—Wofford and Felsman

ABSTRACT: A flow measuring device for providing a constant rate of flow of a fluid regardless of large variations in pressure of the source of the fluid at the inlet to the flow measuring device or variations in pressure of the fluid past the outlet connector therefor characterized by a unitary assembly adapted for installation in a small volume and including several elements. The elements include an inlet connector; an outlet connector; a valve connected with the outlet connector for regulating flow; a rotameter for measuring volume flow rate and sensitive to both volume and pressure changes, and connected with, but upstream of, the valve; and a single stage compensated regulator upstream of and connected with the rotameter, and connected with a high pressure source of the fluid, for preventing an increase in the rate of flow as measured by the rotameter when the pressure in the source of fluid drops. The flow measuring device is particularly useful on oxygen supply systems where the ordinary tendency is for the rotameter reading to increase as the pressure in the oxygen container decreases. Specific structure and embodiments are also disclosed.

PATENTED JUN22 1971
3,586,045
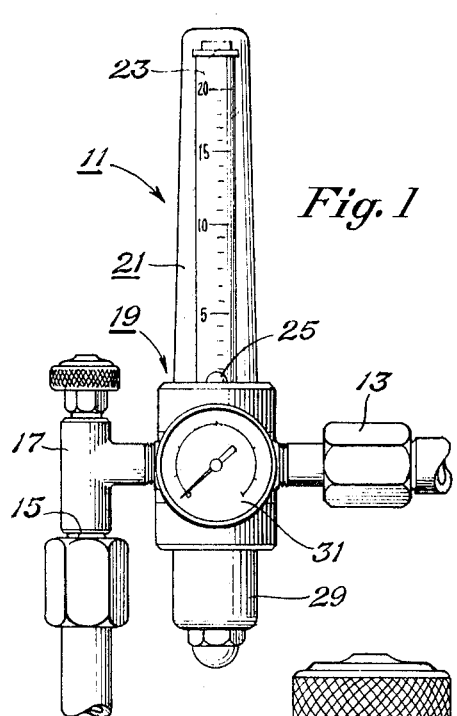
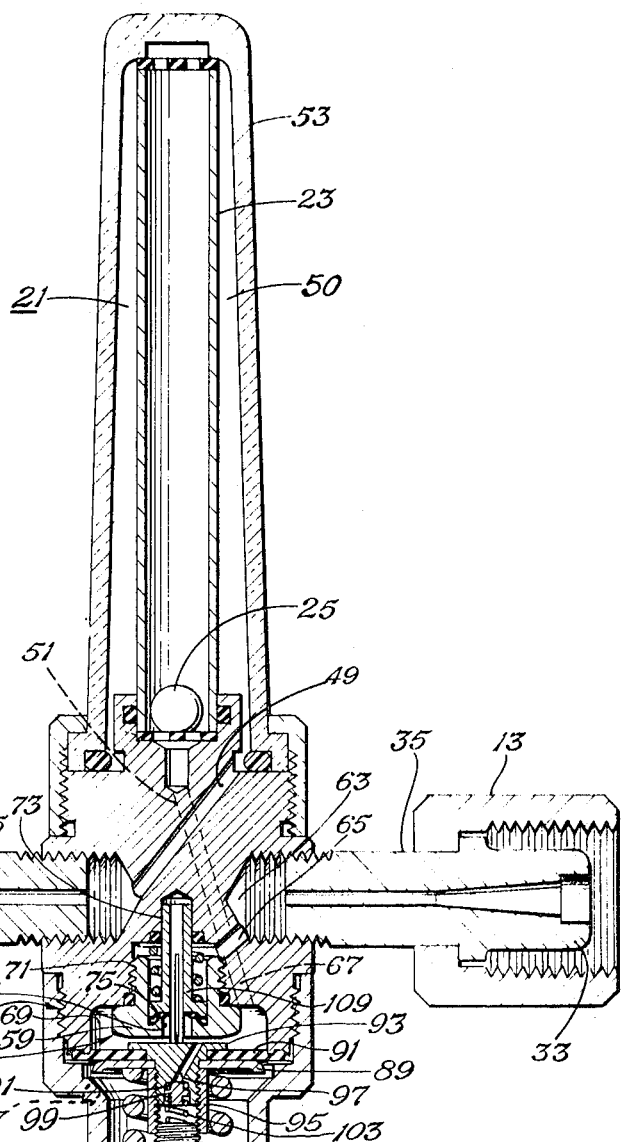
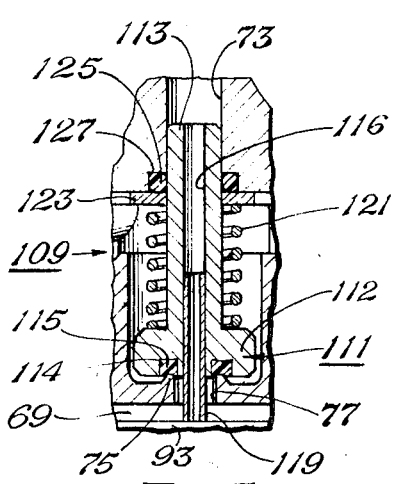
INVENTOR
Ray R. Zimmer
BY
Wofford & Felsman
ATTORNEYS

FLOW MEASURING DEVICE CONTROLLING BOTH PRESSURE AND FLOW RATE

BACKGROUND OF THE INVENTION

1. Field of the Invention

This invention relates to devices for controlling both volume flow rate and pressure of a fluid and affording a visual indication of the volume rate of flow. In a particular aspect, this invention relates to a device for regulating flow, regulating pressure, and measuring and displaying rate of flow of a fluid such as oxygen from a container having a decreasing inlet pressure.

2. Description of the Prior Art

It is, of course, known in the prior art to control the rate of flow of a fluid. Similarly, it is known to control the pressure of a fluid. Moreover, flow measuring devices such as rotameters that are sensitive to both flow and pressure are known. In the prior art devices and systems, employed to administer a high pressure gas from a container into a low pressure system, the tendency has been for the pressure in the low pressure system to climb as pressure on the high pressure container decreased. Consequently, the flow through the system tended to increase because of the higher differential pressure across the flow controllers. In addition, the external manifestations of flow in the flow measuring instruments; such as, the rotameters; increased due to both the increased rate of flow and the increased pressure on the fluid whose flow was being measured. For example, in oxygen systems in which oxygen was being supplied from an oxygen container into an oxygen tent, the prior art systems allowed pressure to increase such that when a rotameter was initially set on an indication of, for example, 5, it rapidly climbed to a higher indication; for example, about 9. The foregoing discussion is true of stem type regulators. In the nozzle-type regulators the tendency has been for pressure in the low pressure system to decrease as the pressure in the high pressure container decreased with the attendant reversal in the direction of the changes discussed. Nevertheless, there was the undesirable change. Consequently, the nurse attending the patient had to continuously control the flow control means to maintain the rotameter properly adjusted. Also objectionable was the fact that the rotameter was subject to fluctuations in downstream pressure if the flow rate controller were upstream, or directly subject to the variations in pressure from the pressure regulator if the flow rate controller were downstream of the rotameter. In any event, the rapidity with which settings of the bob on the rotameter changed was disconcerting to nurses and attendants responsible for the care of a patient under an oxygen tent. Hospitals employed elaborate piping systems extending from a central facility, which employed a plurality of staged regulators to attempt to alleviate the problem. Such systems limit flexibility; are subject to decreasing pressure with distance along the piping system away from the central facility; and are very expensive. They also increase potential damage from a fire because of the widespread distribution of pure oxygen.

BRIEF DESCRIPTION OF THE DRAWINGS

FIG. 1 is a front elevational view of one embodiment of the invention.

FIG. 2 is a cross-sectional view of the embodiment of FIG. 1.

FIG. 3 is a cross-sectional view of the core assembly employed in one embodiment of the invention, similar to that illustrated in FIG. 2.

DESCRIPTION OF PREFERRED EMBODIMENT(S)

Referring to FIG. 1, flow measuring device 11 comprises an inlet connector means 13, an outlet connector means 15, a valve means 17 and a compact unitary flowmeter-regulator combination 19.

Inlet connector means 13 will ordinarily be adapted for connection with the high pressure source of the fluid and may be, for example, one-half of a high pressure union for connection with a cylinder containing high pressure gas.

Outlet connector means 15 will be adapted for connection with a using means employing the low pressure fluid and may be a threaded connection adapted to receive tubing fittings and tubing; such as, metallic or plastic tubing.

Valve means 17 may be any sort of flow controller enabling adjusting the rate of flow therepast. For example, a needle valve or other manually operable throttling valve may be employed as the valve means. The valve means 17 is connected with the outlet connector means and the flowmeter-regulator combination. For best results, it is imperative that the valve means be connected downstream of the flowmeter-regulator combination to enable the flowmeter-regulator to accurately control both the flow and pressure without regard to what happens downstream of the valve means.

The flowmeter-regulator combination 19 contains volume rate flow measuring means; such as, rotameter 21; that is sensitive to both volume and pressure.

Rotameter 21 incorporates, as a metering tube means, a calibrated Thrope tube 23 with graduated scale for reading an index related to the rate of flow of the fluid flowing therepast. The calibrated scale affords an indicia only since the bob, or float, 25 may be constructed of different cross-sectional shapes and different specific gravities to change the rate of flow equivalent to a given reading on the Thrope scale. As illustrated, bob 25 is a spherical float. Other well known constructions for bobs include a cylinder with an inverted frustoconical bottom portion and an enlarged cylindrical top, having a plurality of spiral grooves around the periphery to secure rotation of the bob and effect uniform reading for a uniform rate of flow. The various types of bobs are well known and need not be described in detail herein. As illustrated, a transparent retainer means defining an external annular flow passageway is provided; traversing downwardly around the metering tube means, comprising Thrope tube 23. The external annular flow passageway is connected with the metering tube means and with the valve means.

Flowmeter-regulator combination 19 also contains a single stage compensated regulator 29 connected with inlet connector means 13 and with rotameter 21. Single stage compensated regulator 29 enables formation of a small unit that can be readily attached to an oxygen cylinder for home use and yet alleviates difficulties with the increasing reading of the rotameter measuring the flow rate therepast as pressure in the oxygen container decreases. Specifically, the single stage compensated regulator, in conjunction with the rotameter and the valve means, prevents exceeding the given rate of flow through the volume flow rate measuring means once a given rate of flow is set up by the valve means regardless of what happens downstream of the valve means and regardless of decreasing inlet pressure.

A pressure gauge 31 is connected with the inlet connector means 13 for registering pressure at the inlet to the regulator. Gauge 31 also affords an indication of the contents remaining in the container.

The details of construction are illustrated in FIG. 2. Therein, inlet connector means 13 comprises conduit 35 and one-half of a high pressure union 33 adapted for connection with a high pressure cylinder of gas. Outlet connector means 15 comprises a threaded section 37 integral with needle valve 39 serving as valve means 17. Flow passageways 41 and 43 communicate between rotameter 21 and outlet connector means 15. Needle valve 39 contains a needle 45 and seat 47 for blocking or regulating flow of fluids therepast in the usual manner.

Rotameter 21 communicates with passageway 43 via passageway 49 and outer annular flow passageway 50 defined by transparent retainer means 53. Annular flow passageway 50 communicates with the interior of Thrope tube 23. As is well known, Thrope tube 23 varies monotonically in cross-sectional diameter with height of the tube such that as bob 25 is moved upwardly within the tube a larger annular passageway between bob 25 and the walls of Thrope tube 23 enables a greater quantity of fluid to flow therepast with the same differential pressure. Additionally, the specific gravity of the material from which bob 25 is made causes it to have a bouyancy in the fluid flowing therepast. Accordingly, as pressure on the fluid changes, particularly when pressure on a gas changes, an increasing density causes the bob to float higher in the tube at the same velocity of flow of fluid therepast. The bobs are made of a material commensurate with specific gravity and rate of flow of the fluid whose flow rate is to be measured. For example, with low rates of flow of gases a rotameter bob 25 may be made of semiprecious stones; such as, ruby or sapphire. On the other hand, with ordinary flow rates, thermosetting plastics or thermoplastics; such as, nylon; may be employed for manufacture of the bob. For more dense fluids such as liquids the bob 25 may be composed of stainless steel or other inert metals.

The transparent retainer means 53 defines an annular flow passageway back into the unitary body and makes a compact unit. If desired, however, the top of metering tube means 23 can be connected directly to flow passageway 43 by using an appropriate mounting means or an additional conduit.

Single stage compensated regulator 29 communicates with the interior of Thrope tube 23 via passageway 51. As illustrated, regulator 29 comprises the main subassemblies of body 53, regulator portion 55, and flow regulating means 57.

Body 53 has a high pressure inlet 63 and a high pressure chamber 65 in communication therewith. Body 53 also has a low pressure exit or outlet in the form of passageway 67 connecting with passageway 51 and a low pressure chamber 69 in communication therewith.

Flow regulating means 57 is disposed within the body and communicates with the high pressure chamber and the low pressure chamber to regulate the flow of fluid therepast in response only to the force of the spring means in the regulator portion and the regulated pressure in the low pressure chamber. Specifically, a flow regulating seating means is annularly disposed about a flow regulating aperture which communicates with the high pressure chamber and the low pressure chamber. As illustrated, the flow regulating seating means and the flow regulating aperture comprise a ring lip 75 annularly disposed about flow regulating aperture 77, both formed in bushing 59. Bushing 59 is removably affixed, as by threads, within core aperture 71. Ring lip 75 and flow regulating aperture 77 may be formed directly in the body 53. As will be appreciated, the expense is much greater if there is a defective ring lip in the manufacture of the valve body since the body is much more expensive to discard than is bushing 59 in the event of any imperfectly formed ring lip 75 therein.

Body 53 has a cylindrical aperture 73 aligned with the central annular axis of core aperture 71 and flow regulator aperture 77.

Regulator portion 55 is removably affixed to body 53 and has a compression adjusting means illustrated by threaded stud 81. Ordinarily, in this embodiment stud 81 is preset at the factory for a given pressure; for example, 50 p.s.i. Lock cover 82 is provided to prevent accidentally altering the adjustment of stud 81. Spring means; comprising spring 85, compression plate 87 and bottom retainer plate 89 are contiguous with compression adjusting means 81 and responsive thereto. Diaphragm means, including diaphragm 91, sealingly mounted on diaphragm member 93, responsively engages the spring means and seals the bottom side of low pressure chamber 69. Specifically, diaphragm member 93 penetrates through bottom retainer plate 89 and screws into retainer nut 95. A safety release means is provided by way of passageway 97, valve 99, seat 101 and spring 103. Vent apertures 107 equalize the pressure in regulator portion 55 with ambient pressure. Thus, outlet pressure in low pressure chamber 69 is true gauge pressure, being automatically compensated for changing atmospheric pressure. To effect operation of the flow regulating means, a core assembly 109 is inserted into bushing 59 from the top. The details of construction and operation of core assembly 109 are described in my copending application Ser. No. 827,711, "Single Stage, Compensated Pressure Regulator," filed May 26, 1969. Reference is hereby made to that application for a complete description of alternative embodiments and operation.

Core assembly 109 is illustrated, however, in both FIGS. 2 and 3. Briefly, core assembly 109 is inserted in bushing 59 before bushing 59 is screwed into core aperture 71. Core assembly 109 consists essentially of a core body 111 having a first portion 112 and a shaft 113. Shaft 113 conformingly fits cylindrical aperture 73 and is reciprocally movable therewithin. First portion 112 may be of enlarged diameter if desired in order to facilitate emplacement of a resilient sealing means 115 therewithin. Resilient sealing means 115 is fitted within recessed ring 114 in first portion 112. Resilient sealing means 115 is, ordinarily, a ring of firm but resilient plastic such as nylon or a firm elastomeric material such as neoprene rubber. Sealing means 115 seats against lip 75 to block or regulate flow of fluid through flow regulating aperture 77 into low pressure chamber 69.

Aperture means 116 penetrates longitudinally through core body 111 for establishing communication between cylindrical aperture 73 and low pressure chamber 69.

Extension rod stem 119 conformingly engages aperture means 116 and protrudes therefrom to engage diaphragm member 93. Stem 119 has a passageway traversing from its upper end to its lower end and communicating with aperture means 116 and with low pressure chamber 69. Stem 119 must be strong enough to transmit the force from diaphragm member 93 to core body 111 and unseat sealing means 115 from lip 75 to allow fluid to pass therebetween. To transmit this force without slipping, stem 119 must be fixedly but removably mounted by any suitable means in body 111 as described hereinafter.

Spring means; such as spring 121; urges core body 111 downward to engage sealing means 115 with lip 75 and engage extension rod stem 119 with diaphragm member 93. Spring retaining means; such as, first portion 112 and washer 123; hold spring 121 in place about shaft 113 and enables the spring to urge the body downward. Washer 123 also serves to retain a shaft sealing means; such as, O-ring 125; in place around shaft 113. O-ring 125 sealingly engages shaft 113 and shaft seal seating means; such as, recessed ring 127; at the entrance to, contiguous with and concentric about cylindrical aperture 73. O-ring 125 seals against shaft 113 for blocking the flow of fluid from high pressure chamber 65 into cylindrical aperture 73. O-ring 125 within ring 127, serving as seating means, and sealingly engaging shaft 113, also serves to dampen out harmonics, or vibrations during dynamic regulation.

In operation, flow measuring device 11 is connected with a source of fluid and a fluid using means via the respective inlet and outlet connector means. Since initially there is zero gauge pressure in low pressure chamber 69, sealing means 115 is moved off its seat by upward action of diaphragm member 93 under the force of spring 85. Gas flows from high pressure chamber 65 to low pressure chamber 69. Flow will continue until the pressure in low pressure chamber 69 and cylindrical aperture 73 creates a force which when coupled with the action of spring 121 balances the force exerted by spring 85. When just slightly past the balancing point, sealing means 115 seats against sealing lip 75 to shut off the flow. Thus, it can be seen that the flow regulating means is responsive only to the regulated pressure in low pressure chamber 69 and to the force of spring 85 and is rendered essentially independent of the force of the pressure of inlet connector means 13.

Valve means 17 is opened until rotameter 21, having the requisite bob 25, shows the desired indicia on scale on Thrope tube 23, indicating the desired flow has been effected. Thereafter, this flow is maintained independently of fluctuations in pressure downstream of valve means 17 or upstream of the inlet connector means 13. Moreover, there are no variations in specific gravity of the fluid flowing therethrough, since the pressure remains substantially constant. Consequently, variations in indications on the calibrated scale on Thrope tube 23 at bob 25 are avoided. A nurse can merely check the flow control when she comes on her tour of duty and can, for all practical purposes, disregard variations in flow for the remainder of her tour. Such constancy in regulation of the flow of oxygen to individual patients on oxygen bottles has been unknown heretofore. It allows effecting much better care of patients and carrying out the doctors' instructions more readily.

If the flow is to be stopped, valve means 17 is simply cut off. When the pressure attains preset pressure in low pressure chamber 69, sealing means 115 seats against sealing lip 75 and flow from high pressure chamber 65 is blocked from low pressure chamber 69. It may be expedient, of course, to shut off the valve on the source of fluid also.

It will be apparent that lock cover 82 can be removed and pressure altered by screwing stud 81. Screwing inwardly compresses the spring and requires a higher pressure in low pressure chamber 69 to counteract the force of the spring. Screwing outwardly lessens the pressure on spring 85 and requires a lower pressure in low pressure chamber 69 to counterbalance the force of the spring.

As mentioned hereinbefore, stem 119 must retain its relative position to core body 111 to maintain accurate control. It has been found that a particularly effective regulator can be made by forming stem 119 of a roll pin stock having a C-shaped cross section. The roll pin stock is compressed to be inserted within aperture 116 of core body 111. Ordinarily, the spring fit of the roll pin stock grips the walls of aperture 116 with sufficient force to prevent movement. If desired, shoulders can be employed, either in aperture 116 or on the roll pin stock, to ensure there is no relative movement between the roll pin stock and the core body 111.

No exotic new materials are required in construction of the flow measuring device. On the contrary, the elements described herein are well known within the art. Moreover, the precautions ordinarily employed in regulating the flow of a particular gas are suitable and effective in using the invention. For example, it is well known that ordinarily hydrocarbonaceous lubricants are not employed in a regulator in contact with pure oxygen.

This invention provides a compact unitary flow measuring device for providing a constant rate of flow of a fluid regardless of large variations in pressure of the source of the fluid and at the inlet to the flow measuring device, provides a constant rate that is independent of the pressure downstream of a flow measuring means and yet provides a compact unitary assembly well adapted for installations in a small volume, such as on an individual oxygen tent for use in a private home.

Although the invention has been described with a certain degree of particularity, it is understood that the present disclosure has been made only by way of example and that numerous changes in the details of construction and the combination and arrangement of parts may be resorted to without departing from the spirit and the scope of the invention.

What I claim is:

1. A flow measuring device for providing a constant rate of flow of a fluid regardless of large variations in pressure of the source of said fluid and at the inlet to said fluid measuring device comprising a unitary assembly adapted for installation in a small volume and including:
   a. an inlet connector means for connection with a high pressure source of said fluid;
   b. an outlet connector means for connection with a low pressure using means employing low pressure fluid;
   c. valve means connected with said outlet connector means; and
   d. a compact, unitary flowmeter-regulator combination containing;
      i. volume flow rate measuring means that is sensitive to both volume and pressure connected with said valve means;
      ii. a single stage compensated regulator connected with said volume flow rate measuring means and with said inlet connector means for not exceeding a given rate of flow through said volume flow rate measuring means once said given rate of flow is set up by said valve means regardless of what happens downstream of said valve means and regardless of decreasing inlet pressure; said single stage compensated regulator including:
         A. a body having a high pressure inlet connected with said inlet connector means and a high pressure chamber in communication therewith, a low pressure outlet connected with said volume flow rate measuring means and a low pressure chamber in communication therewith; and at the end of said body adjacent said flow rate measuring means, a cylindrical aperture aligned with a vertical axis of said regulator, and a shaft seal seating means at the entrance to, contiguous with, and concentric about said cylindrical aperture;
         B. a regulator portion removably affixed to another end of said body and having a compression adjusting means and a first spring means contiguous therewith, and a diaphragm means responsively engaging said spring means, having a diaphragm member and adapted to seal one side of said low pressure chamber;
         C. a flow regulating seating means annularly disposed about a flow regulating aperture and having a central axis aligned with the axis of said cylindrical aperture; said flow regulating aperture communicating with said high pressure chamber and said low pressure chamber;
         D. a core assembly consisting essentially of:
            I. a core body means having a first portion and a shaft of a diameter for conformingly engaging said cylindrical aperture and adapted to move reciprocally therewithin;
            II. recessed ring in said first portion of said core body;
            III. resilient sealing means in said recessed ring adapted to seat against said flow regulating seating means for sealing and for regulating flow of fluid therepast;
            IV. aperture means penetrating longitudinally through said core body and communicating with said cylindrical aperture and with said low pressure chamber;
            V. stem conformingly engaging said aperture means and protruding therefrom and engaging said diaphragm member of said regulator portion, and having a passageway traversing from its upper end to its lower end and communicating with said low pressure chamber and said aperture means;
            VI. a second spring means urging said core body to engage said resilient sealing means with said flow regulating seating means and said stem with said diaphragm member;
            VII. shaft sealing means in said shaft seal seating means and sealing against said shaft and blocking said fluid in said high pressure chamber from invading said cylindrical aperture; and
            VIII. washer means for retaining said shaft sealing means and said second spring means in their respective places.

2. The flow measuring device of claim 1 wherein said valve means is a manually operable throttling valve.

3. The flow measuring device of claim 1 wherein said volume flow rate measuring means is a flow meter having a metering tube means of variable internal cross-sectional area connected with said low pressure chamber of said single stage compensated regulator and with said valve means, and a bob means freely movable within said metering tube means in response to specific gravity and velocity of fluid flowing therepast.

4. The flow measuring device of claim 3 wherein an annular flow passageway is provided by a transparent retainer means traversing downwardly around said metering tube means and communicating with the interior of said metering tube means and with said valve means.

5. The flow measuring device of claim 1 wherein a core aperture is provided between and communicating with said high pressure chamber and said low pressure chamber and a bushing is removably affixed within said core aperture and said flow regulating seating means and said flow regulating aperture are within said bushing.

6. In a flow measuring device for providing a constant rate of flow of a fluid regardless of large variations in pressure of the source of said fluid and at the inlet to said fluid measuring device and employing an inlet connector means for connection with the high pressure source of fluid, an outlet connector means for connection with a low pressure using means employing low pressure fluid, and a valve means connected with the outlet connector means for regulating flow of said fluid, the improvement comprising a compact, unitary flowmeter-regulator combination adapted for installation in a small volume and including:

a. volume flow rate measuring means that is sensitive to both volume and pressure connected with said valve means;

b. a single stage compensated regulator connected with said volume flow rate measuring means and with said inlet connector means for not exceeding a given rate of the through said volume flow rate measuring means once said given rate of flow is set up by said valve means regardless of what happens downstream of said valve means and regardless of decreasing inlet pressure; said single stage compensated regulator including:

i. a body having a high pressure inlet connected with said inlet connector means and a high pressure chamber in communication therewith, a low pressure outlet connected with said volume flow rate measuring means and a low pressure chamber in communication therewith; and at the end of said body adjacent said flow rate measuring means, a cylindrical aperture aligned with a vertical axis of said regulator, and a shaft seal seating means at the entrance to, contiguous with, and concentric about said cylindrical aperture;

ii. a regulator portion removably affixed to another end of said body and having a compression adjusting means and a first spring means contiguous therewith, and a diaphragm means responsively engaging said spring means, having a diaphragm member and adapted to seal one side of said low pressure chamber;

iii. a flow regulating seating means annularly disposed about a flow regulating aperture and having a central axis aligned with the axis of said cylindrical aperture; said flow regulating aperture communicating with said high pressure chamber and said low pressure chamber;

iv. a core assembly consisting essentially of;

A. a core body having a first portion and a shaft of a diameter for conformingly engaging said cylindrical aperture and reciprocal therewithin;

B. recessed ring in said first portion of said core body;

C. resilient sealing means in said recessed ring adapted to seat against said flow regulating seating means for sealing and for regulating flow of fluid therepast;

D. aperture means penetrating longitudinally through said core body and communicating with said cylindrical aperture and with said low pressure chamber;

E. stem conformingly engaging said aperture means and protruding therefrom and engaging said diaphragm member of said regulator portion, and having a passageway traversing from its upper end to its lower end and communicating with said low pressure chamber and said aperture means;

F. a second spring means urging said core body to engage said resilient sealing means with said flow regulating seating means and said stem with said diaphragm member; and G. shaft sealing means in said shaft seal seating means and sealing against said shaft and blocking said fluid in said high pressure chamber from invading said cylindrical aperture.